(12) United States Patent
Ida et al.

(10) Patent No.: US 8,747,495 B2
(45) Date of Patent: Jun. 10, 2014

(54) SOLIDIFIED BIOMASS

(75) Inventors: Tamio Ida, Kobe (JP); Akio Nakanishi, Kawanishi (JP)

(73) Assignees: Kinki University, Osaka (JP); Naniwa Roki Co., Ltd., Osaka (JP)

( * ) Notice: Subject to any disclaimer, the term of this patent is extended or adjusted under 35 U.S.C. 154(b) by 0 days.

(21) Appl. No.: 13/486,665

(22) Filed: Jun. 1, 2012

(65) Prior Publication Data

US 2012/0240456 A1   Sep. 27, 2012

Related U.S. Application Data

(60) Division of application No. 11/880,649, filed on Jul. 23, 2007, now Pat. No. 8,211,274, which is a continuation-in-part of application No. PCT/JP2006/300985, filed on Jan. 24, 2006.

(30) Foreign Application Priority Data

Jan. 24, 2005   (WO) .................. PCT/JP2005/000880

(51) Int. Cl.
*C10L 5/36* (2006.01)
*C10L 5/44* (2006.01)

(52) U.S. Cl.
USPC .................. 44/530; 44/553; 44/578; 44/605; 44/606; 423/445 R

(58) Field of Classification Search
USPC ........ 44/530, 553, 578, 605, 606; 423/445 R; 585/240
See application file for complete search history.

(56) References Cited

U.S. PATENT DOCUMENTS

| 4,236,897 | A | * | 12/1980 | Johnston | 44/530 |
| 4,787,917 | A | * | 11/1988 | Leclerc de Bussy | 44/606 |
| 5,250,080 | A | * | 10/1993 | Michelena et al. | 44/575 |
| 5,435,983 | A | * | 7/1995 | Antal, Jr. | 423/445 R |
| 5,551,958 | A | * | 9/1996 | Antal, Jr. | 44/629 |
| 5,916,826 | A | * | 6/1999 | White | 44/551 |
| 5,980,595 | A | * | 11/1999 | Andrews | 44/530 |
| 6,506,223 | B2 | * | 1/2003 | White | 44/551 |

FOREIGN PATENT DOCUMENTS

JP   2003206490   *   7/2003

OTHER PUBLICATIONS

JP 20032064980 Machine Translation.*
"The Art, Science and Technology of Charcoal Production", by Michael Jerry Antal, Jr. and Morten Gronli, Ind. Eng. Chem Res. 2003, 42, 1619-1640.*
EP Application No. 06712201.0, Office Action dated Dec. 20, 2014.

* cited by examiner

*Primary Examiner* — Nina Bhat
(74) *Attorney, Agent, or Firm* — Larry E. Henneman, Jr.; Gregory P. Gibson; Henneman & Associates, PLC

(57) ABSTRACT

A solidified biomass consisting of semi-carbonized or pre-semi-carbonized solid matter is pressure-formed from raw biomass material while being heated under a substantially sealed-up condition to allow hemicellulose among the main components of the raw biomass material, i.e. lignin, cellulose and hemicellulose, to be thermally decomposed and to allow a low-temperature reaction to occur between the cellulose and lignin while maintaining their skeletons. The pre-semi-carbonized solid matter or semi-carbonized solid matter has a maximum compressive strength of 60-200 MPa and calorific value of 18-23 MJ/kg.

15 Claims, 5 Drawing Sheets

US 8,747,495 B2

SOLIDIFIED BIOMASS

CROSS-REFERENCE TO RELATED APPLICATION

This application is a divisional of co-pending U.S. patent application Ser. No. 11/880,649 now U.S. Pat. No. 8,211,274 B2), filed Jul. 23, 2007 by at least one common inventor, which claims the right of priority as a continuation-in-part under 35 U.S.C. §120, as authorized by 35 U.S.C. §365(c), to International Application No. PCT/JP2006/300985, filed on Jan. 24, 2006 by the same inventors (published under PCT Article 21(2) in Japanese and not English), which in turn claims priority from International Patent Application No. PCT/JP2005/000880, filed on Jan. 24, 2005, by the same inventors (published under PCT Article 21(2) in Japanese and not English), each of which is incorporated herein by reference in its entirety.

BACKGROUND OF THE INVENTION

1. Field of the Invention

The present invention relates to solidified biomass, and more specifically relates to solidified biomass utilizable as an alternative fuel to coal coke and also as material utilizable for a variety of purposes.

The raw biomass material according to the present invention is defined as a refreshable organic resource derived from organism other than fossil fuel. In this specification, maximum compressive strength (MPa) is indicative of hardness based on JISZ2111 'Compression Test Method of Wood'

A technique for carbonizing the raw biomass material (complete carbonization) is as follows. The raw biomass material such as wood, bark, bamboo or rice hull is heated within the space in which oxygen does not exist or is supplied under control, and then products are obtained, such as gas (e.g., wood gas), liquid (e.g., acetic acid, tar) or solid (e.g., charcoal). In particular, in this invention, the semi-carbonized solid is obtained by stopping carbonizing the raw biomass material before it is completely carbonized so that the raw biomass material is carbonized without releasing combustible gas or liquid. Because the semi-carbonized solid and pre-semi-carbonized solid are in solid state, their transport efficiency and energy efficiency are increased.

2. Description of the Related Art

Global environment problems has become more and more serious in recent years, and reduction of greenhouse gas emission based on Kyoto Protocol adopted at the 3$^{rd}$ conference of the parties of the United Nations Framework Convention on Climate Change (COP3), securement of primary energy sources, and development of clean and renewable energy sources have been pressingly needed in consideration of predicted depletion of fossil fuel in the future.

Biomass has garnered attention as a breakthrough to overcome the situation at the present days.

However, crude biomass material is high in void fraction, bulky, and very low in transportation efficiency. Further, it is relatively low in calorific value, development of transformational technology to convert it to high-value-added products is demanded.

On the other hand, for rapid iron and steel demand in china in recent years, the cost of the coal coke soars suddenly, and the management of foundry industry and iron and steel manufacturers in our country is remarkably oppressed. This is attributable to the fact that domestic production of coal coke is poor and manufacturers of our country depend more on Chinese-produced coal coke.

In the face of such a circumstance, it is desired earnestly in the field of foundry and iron making to develop solid fuel of high hardness made of biomass that can be substituted for several percentages to several tens of percentages of coal coke, thereby reducing fuel cost and also reducing greenhouse gas emission by virtue of carbon-neutral nature of the biomass.

Further, it is important that the quality of ingot is not degraded in quality by utilizing alternative coke fuel.

As technology for utilizing heat of biomass, there are disclosed pellet processing technology (see patent literature 1 mentioned below, for example) and ogalite processing technology (see patent literature 2 mentioned below, for example) as well as widely known carbonization of biomass.

Pellets and ogalite are pressure-densified fuel made by dewatering by allowing free water contained in wood to evaporate at 100° C., thereby improving transportability and combustibility.

Further, there are disclosed a processing method in which biomass material is cut into narrow chips and carbonized in order to obtain carbide efficiently (see patent literature 3 mentioned below, for example), a processing method for producing solid fuel with high energy yield having high energy density by volume and weight (see patent literature 4 mentioned below, for example), and a processing method for producing half-carbonized and pressure-densified fuel (Bio-Carbonized and Densified Fuel, hereafter referred to as BCDF) of high transportability to further improve transportability (see patent literature 5 mentioned below, for example).

BCDF is solid fuel from which a part of chemically-bonded water contained in cellulose, etc. as well as free water contained in wood are dehydrated, thereby further improving transportability and combustibility.

The patent literatures 1 to 5 aim to produce solid fuel with increased heat energy yield in order to efficiently utilize woody biomass as a heat source.

However, woody biomass group solid fuel produced by methods mentioned above does not have enough calorific value as compared with coal coke and further is not enough in hardness. Therefore, the solid fuel cannot endure the severe condition when burned in the furnace together with coal coke; it is destroyed and burned in the furnace, resulting in that it is difficult for the solid fuel to work as alternative fuel to coal coke.

Further, there are various kinds of biomass such as herb group biomass (grass, sunflower, etc.) and leftover food group biomass (bean-curd refuse, rice hulls, etc.), which are higher in water content and higher in void fraction as compared with wood biomass, so less suitable to utilize as solid fuel, and have been disposed of unutilized. Means to effectively utilize those kinds of biomass has been groped.

Patent literature 1: Japanese Laid-Open Patent Application No. S52-101202

Patent literature 2: Japanese Utility Model Gazette No. H08-8085

Patent literature 3: Japanese Laid-Open Patent Application No. 2004-43517

Patent literature 4: Japanese Laid-Open Patent Application No. 2003-213273

Patent literature 5: Japanese Laid-Open Patent Application No. 2003-206490

DISCLOSURE OF THE INVENTION

Problems to be Solved by the Invention

The present invention was made in light of the problems mentioned above, and the object of the invention is to provide solidified biomass utilizable as alternative fuel to coal coke and also as material utilizable for a variety of purposes.

Means for Solving the Problem

One embodiment of the present invention provides a solidified biomass consisting of semi-carbonized solid matter or pre-semi-carbonized solid matter resulted through processing in which raw biomass material which is photosynthetic product is pressure-formed while being heated under a substantially sealed-up condition. The semi-carbonized solid is produced by carbonizing the raw biomass material without releasing combustible gas or liquid, and the pre-semi-carbonized has the state before becoming the state of the semi-carbonized solid. The pre-semi-carbonized or semi-carbonized solid has maximum compressive strength from 60 to 200 MPa and a calorific value from 18 to 23 MJ/kg.

In another embodiment of the present invention, the pre-semi-carbonized or semi-carbonized solid matter has an apparent specific gravity from 1.2 to 1.38.

In another embodiment of the present invention, the solidified biomass consists of carbide formed by further pressure-forming the pre-semi-carbonized or semi-carbonized solid matter while heating the same.

Another embodiment of the present invention provides solidified biomass, wherein the pre-semi-carbonized or semi-carbonized solid matter is formed by mixing raw biomass material which is photosynthetic product with metal particles, and then pressure-forming the resultant mixture while heating it.

Another embodiment of the present invention provides a solidified biomass consisting of the pre-semi-carbonized or semi-carbonized solid matter formed by mixing raw biomass material which is photosynthetic product with particulate carbide having biomass as main components, and then pressure-forming the resultant mixture while heating the same.

Another embodiment of the present invention provides a solidified biomass consisting of the pre-semi-carbonized or semi-carbonized solid matter formed by mixing raw biomass material which is photosynthetic product with ash of material having biomass as main component and being reduced to the ash, and then pressure-forming the resultant mixture while heating the same.

Another embodiment of the present invention provides a method of producing solidified biomass comprising:
    crushing raw biomass material which is photosynthetic product;
    loading a barrel with said crushed raw biomass material;
    inserting a pressure applying tool slidably into a hollow of said barrel loaded with said crushed raw biomass material so that pressure can be applied to said crushed raw biomass material by said pressure applying tool;
    pressure-forming said crushed raw biomass materials by applying pressure to the material with said pressure applying tool slidably inserted into the barrel while heating the material;
    allowing hemicellulose among the main components of said raw biomass material, i.e. lignin, cellulose and hemicellulose, to be thermally decomposed and allowing low-temperature reaction to occur between cellulose and lignin while maintaining their skeletons, thereby obtaining semi-carbonized solid matter or pre-semi-carbonized solid matter;
    cooling said semi-carbonized solid matter or pre-semi-carbonized solid matter while maintaining pressure of said pressure-forming to obtain a cooled solid; and
    taking out and drying said cooled solid.

In another embodiment of the present invention, the steam and gasified components generated from said raw biomass material when it is heated and pressure-formed are trapped within said barrel by means of said pressure applying tool inserted into the barrel.

In another embodiment of the present invention, the barrel is a cylindrical vessel, and said pressure applying piston is a cylindrical body slidably fitted into the hollow of the cylindrical vessel.

Another embodiment of the present invention provides a method of producing solidified biomass comprising:
    crushing raw biomass material which is photosynthetic product;
    loading a barrel with said crushed raw biomass material;
    inserting a pressure applying piston into a hollow of said barrel loaded with said crushed raw biomass material;
    pressure-forming said crushed raw biomass material by applying pressure to said material with said pressure applying piston while heating the material in a substantially sealed-up condition in the barrel;
    maintaining the heating and pressurizing for predetermined time so as to obtain semi-carbonized solid and pre-semi-carbonized solid wherein the semi-carbonized solid is produced by carbonizing the raw biomass material without releasing combustible gas or liquid;
    cooling said semi-carbonized solid matter or pre-semi-carbonized solid matter while maintaining pressure of said pressure-forming to obtain a cooled solid; and
    taking out and drying said cooled solid,
wherein said pressure applying piston and the hollow of said barrel are formed such that the piston can be fitted slidably into the hollow with very small clearance between their outer and inner peripheries.

In another embodiment of the present invention, the crushed raw biomass material has a particle size of 3 mm or less.

In another embodiment of the present invention, the heating temperature is 115-230° C., and pressure of pressure-forming is 8-25 MPa.

In another embodiment of the present invention, the metal particles are added when loading said barrel with said crushed raw biomass material.

In another embodiment of the present invention, the particulate carbide having biomass as a main component is added to said barrel when loading said barrel with said crushed raw biomass material.

In another embodiment of the present invention, the ash of material having biomass as main component and being reduced to the ash is added when loading said barrel with said crushed raw biomass material.

Another embodiment of the present invention provides method of producing carbonized solidified biomass from solidified biomass of the invention, comprising: heating solidified biomass obtained from the above, allowing carbonization of said solidified biomass by maintaining heating temperature and air pressure for predetermined time to obtain carbonized solidified biomass, cooling said carbonized solidified biomass while maintaining said pressure to obtain a cooled carbide solid, and taking out and drying said cooled carbide solid.

In the other embodiment of the present invention, the heating temperature is 250-350° C., and air pressure under which said solidified biomass is heated is 8-16 MPa.

Effect of Invention

The solidified biomass of the invention having maximum compressive strength of 60-200 MPa and calorific value of 18-23 MJ/kg, can be used in iron casting or iron making as alternative coke to be mixed with coal coke. Further, as it has maximum compressive strength of 60-200 MPa, it can be utilized as material for a variety of application purposes.

The solidified biomass having apparent specific gravity of 1.2-1.38 that is not largely different from its true specific gravity of 1.4, has little internal void and carbon ratio per volume thereof is almost maximized, so it is increased maximally in transportability.

The carbonized solidified biomass of the invention can be obtained by heating the solidified biomass of the invention in pressurized air for a short time period. The resultant carbide, the carbonized solidified biomass, has almost the same solid-combustion-characteristics as bincho-tan, the best vegetable charcoal in Japan.

The solidified biomass produced by using as material a mixture of raw biomass material which is photosynthetic product and metal particles, can absorb heat efficiently due to the presence of the metal particles in heating and pressure-forming process, resulting in homogeneous formation of pre-semi-carbonized or semi-carbonized solid matter. Furthermore, the metal particles added to the raw material and accordingly contained in the bio-coke become molten metal in casting or iron-making process upon melting. Therefore, by adding particles of metals adjusted beforehand in mixing ratio of metals to the biomass material, adjustment of ingredients in iron casting or iron making can be achieved.

The solidified biomass produced by using as material a mixture of raw biomass material which is photosynthetic product and a particulate carbide having biomass as a main component, is increased in carbon ratio per unit weight and unit volume, therefore increased in calorific value and combustion duration.

The solidified biomass produced by using as material a mixture of raw biomass material which is photosynthetic product and ash of material having biomass as main component and being reduced to the ash, can be utilized to adjust silicon content in the molten metal in iron casting or iron making without affecting heating performance of the furnace.

According to the methods of the present invention for producing solidified biomass, heating and pressure-forming is performed by charging a molding barrel with crushed raw biomass material and applying pressure on the material by pressure applying piston inserted slidably into the hollow of the barrel with small clearance between the inner and outer periphery of the barrel and piston, so steam and gasified components generated from the biomass material is trapped within the barrel during the heating/pressure-forming process. Further the biomass can be reformed with superheated steam. Therefore, pre-semi-carbonized or semi-carbonized solid matter with high hardness and a high calorific value is obtained. The solidified biomass can be utilized as material for various application purposes for example for a pile or slope-plate.

By using crushed raw biomass material crushed into particles of 3 mm or smaller in size as material for producing the solidified biomass, the material can be loaded in the barrel evenly. By setting heating temperature to 115-230° C. and pressure of pressure-forming to 8-25 MPa, pre-semi-carbonized or semi-carbonized solid matter having high hardness and calorific value can be formed without requiring excessive process energy.

By adding metal particles to the raw biomass material when charging the barrel with the material, the mixture of the raw biomass material and the metal particles can absorb heat efficiently, and homogeneously formed pre-semi-carbonized or semi-carbonized solid matter can be obtained. Furthermore, the metal particles added to the raw material and accordingly contained in the bio-coke become molten metal in casting or iron-making process upon melting. Therefore, by adding particles of metals adjusted beforehand in mixing ratio of metals to the biomass material, adjustment of ingredients in iron casting or iron making can be achieved.

By adding a carbide having biomass as a main component to the raw biomass material when charging the barrel with the material, pre-semi-carbonized or semi-carbonized solid matter increased in calorific value and combustion duration can be formed.

By adding ash of material having biomass as main component and being reduced to the ash to the raw biomass material when charging the barrel with the material, pre-semi-carbonized or semi-carbonized solid matter can be formed with which silicon content in the molten metal in iron casting or iron making can be adjusted without affecting heating performance of the furnace.

By heating the solidified biomass in an open atmosphere for predetermined time and then cooling under the pressurized air, carbonized solidified biomass can be obtained in a short amount of time.

In this case, it is preferable to heat the solidified biomass to temperature of 250-350 under pressurized air of pressure of 8-16 MPa. By this, the solidified biomass is carbonized evenly and carbide with high degree of adhesion can be obtained in a short amount of time.

BEST MODE FOR CARRYING OUT THE INVENTION

Figure 1:
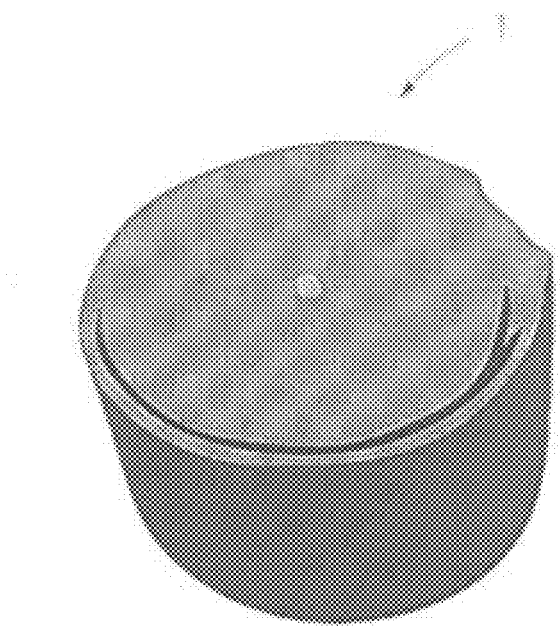
FIG. 1 is a perspective external view of an example of the bio-coke according to the present invention.

Solidified biomass of the invention (hereafter referred to as bio-coke) and processing methods thereof will now be detailed with reference to the accompanying drawings. FIG. 1 is a perspective external view of an example of the bio-coke (1) according to the present invention. Bio-coke (1) of the invention can be produced using all kinds of biomass material that are photosynthetic products. As photosynthesized biomass can be cited for example wood group, herb group, farm products, kitchen waste, etc.

As wood group biomass can be cited for example wood, dead leaves, clipped or pruned branch and leaves, drift wood, waste paper, etc.

As herb group biomass can be cited for example stems of kenaf, sunflower, etc.

As biomass of farm products can be cited for example plantain stems, sesame stems, sweet-potato vines, rice hulls, etc.

As biomass from kitchen waste can be cited for example coffee grounds, tea grounds, bean-curd refuse, etc.

Such biomass is composed of cellulose, hemicellulose, and lignin as its main components.

As to heat-resisting properties of these main components of biomass under atmospheric pressure, a large part of free water is dewatered by evaporation at about 100° C. Discoloration, decomposition or softening, gasification, and further generation of heat and progression of carbonizing occur at above the following temperatures for each of the components; lignin (280~550° C.), cellulose (240~400° C.), and hemicellulose (180~300° C.). Lignin is highest in heat-resisting property, followed by cellulose and hemicellulose in this order.

Cellulose is a highly crystallized chain polymer having distinct orderly bond-structure and polymerization grade of 2000~15000, so it assumes an important role in hardness property of the entire biomass.

Lignin has extremely complex three-dimensional bond-structure, so its contribution to hardness property of the entire biomass is also high.

In contrast, hemicellulose has branched structure and polymerization grade of 50~200 that is lower as compared with that of cellulose, so its contribution to hardness property of the entire biomass is low.

We discovered that solid matter, i.e. bio-coke very high in hardness and superior in burning characteristic can be produced by allowing hemicellulose which is structurally brittle and low in heat-resisting property to be thermally decomposed thereby allowing development of adhesion effect, compressing biomass material to allow thermosetting reaction to occur between cellulose and lignin while they are maintaining their skeletons, and improving surface burning characteristic of solid.

Thermosetting reaction progresses due to arousal of reaction active site between phenolic macromolecules contained in lignin, etc.

This is verified by the fact that presence of cresol in lignin molecules of lignin-cresol reaction product was confirmed by $H^1$-NMR analysis. This means that reaction occurred between lignin and cresol and cresol was infused into lignin molecules. This ensures that thermosetting reaction will occur between phenol molecules and relatively homogeneous and strong intermolecular network will be formed.

Further, it is possible to activate the thermosetting reaction by confection of material and lower the temperature of pressure forming by 10~60° C. or further.

Therefore, it become possible to induce occurrence of thermosetting reaction at low temperature without carbonizing biomass and attain burning characteristic of solidified biomass substitutable for coal coke.

Figure 2:
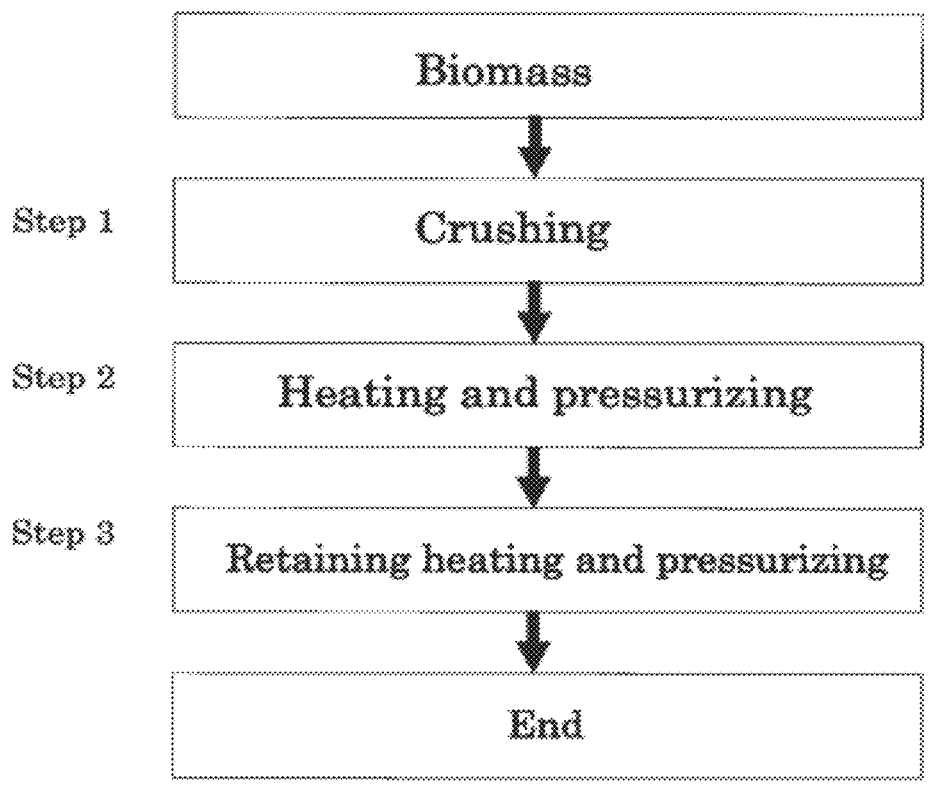
FIG. 2 is a flow chart showing production process of the bio-coke according to the present invention.

FIG. 2 is a flow chart showing production process of the bio-coke according to the present invention. Production method of bio-coke of the invention will be detailed hereunder with reference to FIG. 2.

As shown in FIG. 2, process of producing the bio-coke is divided largely in three steps.

In the first step, biomass material is broken into fractures of 3 mm or smaller in size.

In the second step, the biomass material broken into fractures in the first step is heated to a temperature range of 115~230° C. and molded applying pressure controlled in a pressure range of 8~25 MPa.

In the third step, the state of heating and application of pressure in the second step is maintained for 10~20 minutes.

Then, the biomass is cooled while maintaining the application of pressure in the third step, then the molded biomass is taken out and dried to complete production of bio-coke of the invention.

Production method mentioned above will be explained in a knowledgeable way.

Biomass material for producing the bio-coke is high in void fraction and its surface area is small in the state as it is, so it is unsuited to heating and pressure-forming. Therefore, in order to perform homogeneous molding, first the biomass material is fractured to pieces of grain size smaller than 3 mm or smaller, preferably to 0.1 mm or smaller by a crushing means such as a mixer.

By this, the biomass material can be filled in a molding barrel (mentioned later) in a homogeneous state with increase density. Accordingly, contact area of the biomass pieces in heating and pressure-forming, and hardness of molded biomass increases.

Then, the crushed biomass material is filled in a molding barrel such as a cylinder, and after that a pressure piston for applying pressure is inserted into the molding barrel.

Here, the shape of the molding barrel and pressure piston is not particularly specified, shape of cross section of them is preferable to be circular. By adopting circular cross section, molding processing can be performed stably even when the molding barrel or pressure piston is twisted slightly in pressure-forming process.

The inner diameter of the molding barrel and outer diameter of the pressure piston are determined to be nearly equal, and steam and gasified components generating from the biomass material when heating and pressure-forming the biomass material can be retained inside the molding barrel, reforming of biomass by superheated steam is possible, and bio-coke having high calorific value and high hardness can be obtained.

After the fractured biomass material is filled in the molding barrel, heating and application of pressure is carried out under a condition of temperature of 115~230° C. and pressure of 8~25 MPa as mentioned above. This heating and pressurizing process is maintained for 10~20 minutes. As to heating method, it is suitable for example that a heating means such as electric heating means is provided to surround the outer circumference of the molding barrel and the biomass material is heated via the molding barrel. Pressure forming is carried out by means of the pressure piston. As to method of applying pressure, it is suitable to push the pressure piston by means of a oil hydraulic jack, etc. However, attention should be paid, for there might occur the case that the vapor pressure generated in the molding barrel exceeds the pressure applied by the pressure piston.

By carrying out heating and pressurizing under a condition mentioned above, bio-coke can be obtained which is high in hardness and high in calorific value without requiring excess process energy.

This is because that, by performing heating under a temperature condition of 115~230° C., hemicellulose is thermally decomposed, cellulose and lignin react with each other at low temperature under the presence of superheated steam generated in the molding barrel while maintaining their skeletons, which acts synergistically together with pressure forming effect, thereby increasing hardness of the solidified biomass.

It is more preferable that the heating and pressure forming is carried out under temperature range of 185~230° C. and pressure range of 12~19 MPa.

The bio-coke is cooled to 40~50° C. or lower for about 30~60 minutes with the pressurized state maintained, then the bio-coke is taken out of the molding barrel. If the bio-coke is taken out when its temperature is higher than said temperature range or when pressurized state is not maintained during the cooling, adhesion effect of hemicellulose decreases. As to cooling method, natural cooling by atmospheric air is preferable. If cooling time is too short, occurrence of crack on the surface and reduction in hardness may be induced.

Further, 5~10 wt % of steam is condensed again in the bio-coke just after it is taken out of the molding barrel because it has been molded in near hermetical state, i.e. under near vacuum. Hardness can be increased by dewatering through drying it.

Drying method is not particularly limited, and natural drying by leaving it in the atmosphere or drying in a temperature-controlled room of 80~100° C. can be cited for example.

The bio-coke produced through the process mentioned above is excellent in physical properties having specific gravity of 1.2-1.38, maximum compressive strength of 60-200 MPa, calorific value of 18-23 MJ/kg, that means superior both in hardness and combustion properties as compared for example with untreated wood biomass with apparent specific gravity of about 0.4-0.6, calorific value of about 17 MJ/kg and maximum compressive strength of about 30 MPa.

The bio-coke of the invention is superior in hardness and combustion properties also as compared with coal coke which has apparent specific gravity of about 1.85, maximum compressive strength of 15 MPa and calorific value of 29 MJ/kg.

Apparent specific value of 1.2-1.38 of the bio-coke of the invention is much the same as that of true specific gravity of biomass. Like this, the bio-coke of the invention has few internal voids, so it is possible to nearly maximize carbon ratio per volume and obtain nearly maximum heat energy generation of about 30 GJ/m$^3$. Further, its transportability is increased maximally.

Next, variants of the production method of bio-coke according to the invention will be described hereunder. In the following variants of production method, production processing itself is not changed, only materials to produce bio-coke are changed.

In a first variant, metal particles are added to biomass material and the mixture is heated and pressure-formed.

As metal particles to be added can be cited for example Fe (iron), Ni (nickel), Cu (copper), Mn (manganese), etc.

As to grain size of metal particles, the smaller, the better. It is preferable to mix metal particles of grain size of about 3 mm or smaller (more preferably 0.1 mm or smaller). This is to allow the metal particles mixed evenly and brought into uniform contact with the biomass material in the molding barrel.

The bio-coke produced in this manner will have maximum compressive strength of 60-200 MPa, calorific value of 1-23 MJ/kg, and apparent specific gravity of 1.3-6.0.

The bio-coke effectively absorbs heat applied from outside and contact reaction between pieces of biomass materials is promoted by the presence of the metal particles, which leads to increased compressive strength of the moiled biomass.

The metal particles added to the raw material and accordingly contained in the bio-coke become molten metal in casting or iron-making process upon melting.

Generally, in casting or steel making process, adjustment of ingredients is required in the final stage of processing in accordance with properties required to the cast iron or steel (e.g. in steel converter, etc.). By adding particles of metals adjusted beforehand in mixing ratio of metals to the biomass material, the adjustment of ingredients in the final stage can be omitted, resulting in cost reduction.

In a second variant, carbides consisting of carbonized biomass, etc. are added to biomass material and the mixture is heated and pressure-formed.

As bio-coke contains about 40-50 wt % of carbon in biochemical point of view, it is inferior in characteristic of char combustion effected by surface reaction of solid as compared with coal coke by about 50-60%. This does not affect the calorific value and heat-release temperature, however, relates to heat-release duration.

To deal with this, in this embodiment, bio-coke is formed by compounding carbide (calorific value of 33-42 MJ/kg) consisting of carbonized biomass, etc. with biomass material (compounded such that the carbide is wrapped around by the biomass material).

In this manner, bio-coke increased in carbon ratio by volume and by weight and improved in combustion duration and calorific value can be obtained. That means, surface combustion characteristic of solid can be increased in this way.

The carbide consisting of carbonized biomass, etc. preferably be crushed to pieces of 3 mm or smaller in size, more preferably be crushed to powder of 0.1 mm or smaller in grain size.

Not only carbide made from biomass material but also carbide powder made from waste material derived from fossil resources can be suitably used as the carbide mentioned above.

The bio-coke of carbide compounded type produced as mentioned above will have maximum compressive strength of 60-200 MPa, calorific value of 18-27 MJ/kg, apparent specific gravity of 1.3-1.4.

Therefore, when carbide powder is mixed to be 50 wt % of total material for example, the bio-coke produced in this manner will be increased in carbon ratio by about 75%, in calorific value by about 15% to 24.5 MJ/kg, and also will be increased in combustion duration.

In a third variant, ash of biomass etc. are added to biomass material and the mixture is heated and pressure-formed.

As material to obtain ash can be cited waste vegetable food, construction scrap uncoated with paint containing CCA (chrome, copper, arsenic), heat insulating materials, etc.

Generally, in casting and iron making, Fe—Si is cast in the furnace together with coal coke to add Si for component adjustment. Although biomass material contains silicon, by adding ash of biomass, etc. to biomass material and molding by heating and pressure-forming, silicon content in the bio-coke produced in the manner can be adjusted without decreasing calorific value and hardness thereof In a fourth variant, biomass containing natural sulfur amply is added to biomass material and the mixture is heated and pressure-formed.

Some kind of biomass contains sulfur, phosphorus, and the like in a state of lignin sulfonic acid or the like by 10% or more by volume produced in photosynthesis process. This is caused by the fact that a large amount of sulfur and phosphorus, and the like are contained in the soil in which such biomass grows.

As already mentioned, properties required to cast iron and steel differ according to their intended purposes, so it is necessary to perform component adjustment in the final step of the processing. Sulfur, phosphorus, and the like also need to be adjusted.

Therefore, by adding biomass containing natural sulfur and the like by 10% or more by volume to biomass material in a state similar in particle size as that of the biomass material and molding by heating and pressure-forming, content of sulfur and the like in the bio-coke can be adjusted without decreasing calorific value and hardness, and content of sulfur and the like in the cast iron and iron ingot can be adjusted in casting or iron making process. As natural sulfur, phosphorus, and the like are compounded as additives instead of using those contained originally in fossil fuel, environmental load can be reduced.

When cast iron or iron ingot containing a large amount of sulfur or the like is required, it is suitable to produce bio-coke using only biomass material containing a large amount of sulfur and the like.

As described above, bio-coke according to the present invention is able to be used as a heat source, reducing agent, etc. in a cupola or blast furnace foundry or steel manufacturing. High compressive strength of the bio-coke allows it to be used as material for various application purposes. The bio-coke of the present invention can be formed into solid of diameter of 0.1-250 mm and height of 1-1000 mm.

Here, as an example of use, a case used in a cupola as alternative coke will be explained.

Figure 3:
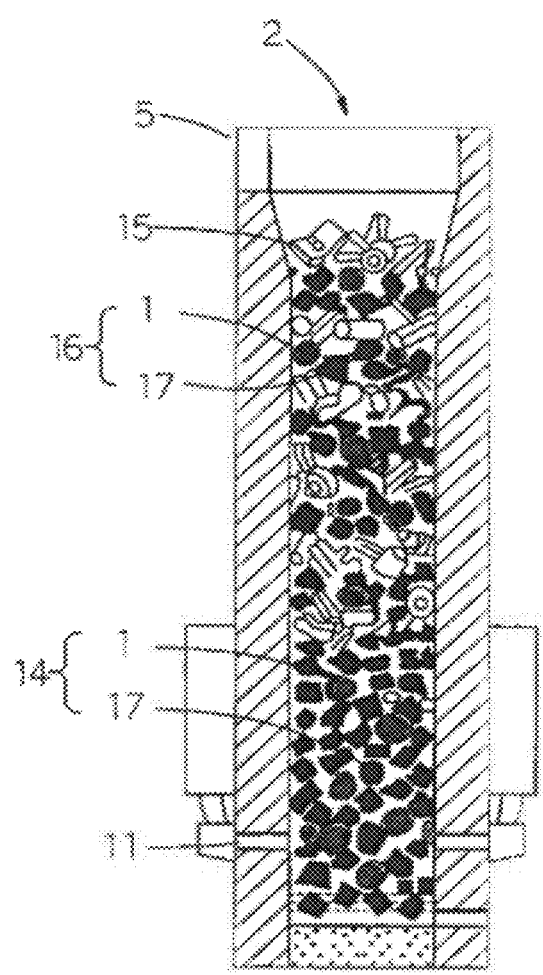
FIG. 3 is a schematic sectional view of a cupola type melting furnace when the bio-coke of the invention is used as alternative coke.
Figure 4:
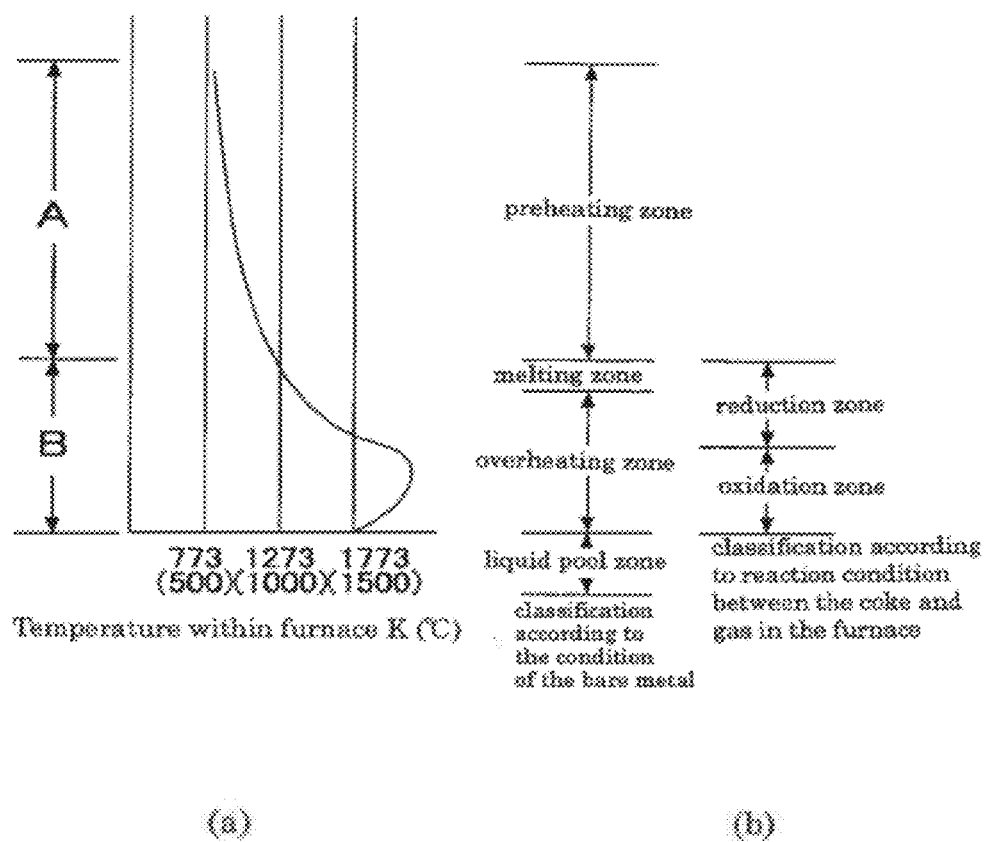
FIG. 4 is a diagram showing temperature characteristic in a cupola type melting furnace when the bio-coke of the invention is used as alternative coke.
Figure 5:
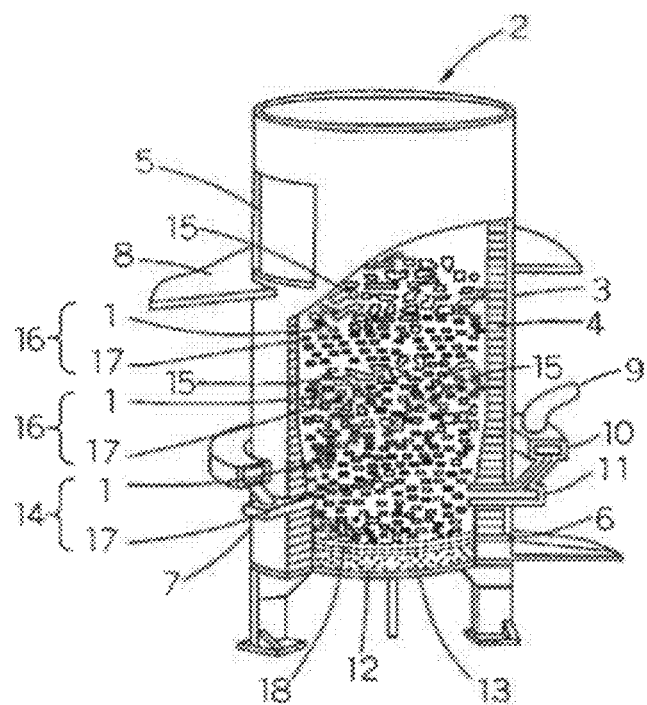
FIG. 5 is a perspective external and partially broken view of a cupola type melting furnace when the bio-coke of the invention is used as alternative coke.

A schematic sectional view of a cupola type melting furnace (2) is shown in FIG. 3, its temperature characteristic in FIG. 4, and a partially-cutaway perspective view of the furnace in FIG. 5.

The cupola type melting furnace (2) shown in FIGS. 3 and 5 is an elongated closed-bottom cylindrical furnace having an external surface covered with a steel plate (3) and having an internal surface formed with a firebrick wall (4). The tubular furnace (2) has a charging hole (5) on its upper part, a tap hole (6) and a slug hole (7) near its bottom. Below the charging hole (5) is disposed a charging platform (8). Slightly above the tap hole (6) is disposed a tuyere (11) continuously connected to a blast pipe (9) and wind box (10). On the furnace bottom (12) is disposed a door (13).

When the cupola type melting furnace (2) is used for iron casting or steel manufacturing, first, bed coke (14) is laid on the furnace bottom (14), and bare metal (15) and coke charge (16) are laid such that the bare metal (15) and coke charge (16) form alternate layers of bare metal (15) and coke charge (16) and empty space is formed between each layer.

Here, both the bed coke (14) and coke charge (16) are mixtures of coal coke and bio-coke (1) of the invention with proportion of the bio-coke (1) of several % to 50%.

FIG. 4a shows a temperature distribution within the furnace.

The distribution of the temperature within the furnace is as follows.

In the upper region (A) where the bare metal (15) and coke charge (16) are piled, temperature gradually increases downward from about 500° C. to about 1000° C. In the lower region (B) where the bed coke (14) is laid, temperature increases rapidly to about 1800° C., then decreases to about 1600° C.

FIG. 4b shows classification of conditions in the furnace. In the Left part of FIG. 4b is shown classification according to the condition of the bare metal (15).

A preheating zone is formed in the upper part where the bare metal (15) and coke charge (16) are alternately piled. The bare metal (15) is preheated in this region. A melting zone is formed in the border zone between the upper region (A) and the lower region (B). The bare metal (15) is melted in the melting zone. An overheating zone is formed in the lower part of the furnace where the bed coke (14) is laid and temperature reaches a peak. The bare metal (15) melted in the melting zone is overheated in the overheating zone. A liquid pool zone where molten metal (18) accumulates is formed in the bottom part below the tuyere (11). In the basin-region, a melted metal (18) is collected.

In the preheating zone, empty space is formed through which air or combustion gas of coke flows. As the bio-coke (1) of the invention has compressive strength about 10 times stronger than that of the coal coke (17), the bio-coke (1) is not destroyed by the load applying from upward and the empty space can be maintained.

In the right part of FIG. 4b is shown classification according to reaction condition between the coke and gas in the furnace.

The melting zone and overheating zone are classified into a reduction zone and an oxidation zone as shown in the drawing, an upper zone being the reduction zone and lower zone being the oxidation zone.

In the reduction zone, $CO_2$ generated from combustion reaction in the oxidation zone is reduced. The reduction zone is formed by the reduction of the $CO_2$ and also gases resulting from gasification of the bio-coke (1), more specifically, by gases (CO, $H_2$, etc.) generated by thermal decomposition and gasification of the cellulose and lignin of the bio-coke (1). In other words, it means that the bio-coke (1) works as a reducing agent.

When biomass is heated under a reduction atmosphere, the resulting exothermic reaction causes gasification, and further promotes self-gasification reaction. This is the reason why reduction zone (i.e., the region in which the gasification of the bio-coke (1) occurs) is formed in the upper part of the bed coke (14) within the furnace.

The oxidation zone is the lower zone of the overheating zone, and temperature reaches 600° C. or more in the oxidation zone. In the oxidation zone, bio-coke (1) is completely gasified or burned (oxidized) to ash and heat for melting the bare metal (15) is generated.

The reason why such an oxidation zone (i.e., the region in which the complete-gasification or combustion of the bio-coke (1) occurs) formed in the lower part below the bed coke (14) is that a combustion reaction is promoted by air blown in from the lower part of the furnace through the tuyere (11).

Now, the combustion properties of the bio-coke (1) will be set forth.

The coal coke (17) has a calorific value of about 29 MJ/kg. On the other hand, the bio-coke (1) has a calorific value ranging from 18 to 23 MJ/kg which is slightly lower than the coal coke (17). Calorific value and heat-release temperature of the bio-coke change in accordance with change in weight thereof caused by gasification/carbonization processes thereof First, at temperatures between ambient temperature and 250° C., the bio-coke is only heated, and an exothermic reaction does not occur.

At temperatures between 250° C. and about 600° C., heat is released while gas components such as CO, $H_2$, etc. being released due to gasification of the biomass, however, temperature of heat release tends to be slightly low.

At 600° C. or higher, char combustion of bio-coke is caused by surface reaction of solid and heat release temperature comparable to that of the coal coke (17) can be attained. The heat-release temperature of the bio-coke momentarily exceeds that of the coal coke (17) and calorific value of about 33-42 MJ/kg that is comparable to that obtained when coal is burned.

Therefore, full merit of the bio-coke (1) as a source of melting energy can be realized in an atmosphere of 600° C. or higher.

Iron casting process or steel manufacturing process using the cupola type melting furnace (2) constructed as described above will be set forth hereinafter.

First, the bare metal (15) and coke charge (16) are introduced from the charging hole (5) into the cupola type melting furnace (2) as shown in FIGS. 3 and 4, the coke charge (16) being a mixture of coal coke (17) and bio-coke (1) with the bio-coke (1) mixed in an appropriate proportion, for example several % to 50% of the total amount of the mixture.

Next, when the inside of the furnace is heated while supplying air from the tuyere (11), the bed coke (14) in the reduction zone is gasified, volatile gases are generated to further enhance the formation of the reduction zone. The bed coke (14) in the oxidation zone is completely gasified or burned (oxidized).

The pile of the bare metal (15) and coke charge (16) alternately piled in the upper part of the furnace collapses and moves down while being preheated as the bed coke in the lower region within the furnace is gasified or burned.

The bare metal moved down is melted by the heat generated by the combustion of the coke laid in the oxidation zone, reduced by air supplied from the tuyere (11), then taken out through the tap hole (6) as molten metal (18).

The molten metal (18) can be obtained in a temperature state as hot as molten metal obtained when conventional coal coke is used or even hotter, owing to the superior combustion characteristics of the bio-coke (1) in the high temperature region as mentioned above.

As the bio-coke of the invention can be adjusted in components at the early stage of its production, it is not needed to adjust in components using converter. This makes it possible to simplify the entire production steps and thereby reduce cost.

As described above, the bio-coke according to the present invention can be used as alternative coke to mix with coal coke by proportion of several % to 50% in iron casting or steel manufacturing. In this case, effect similar or even superior to that obtained when 100% coal coke is used can be obtained.

As the bio-coke of the invention can be produced by using an apparatus of relatively simple construction, production cost thereof can be reduced as compared with coal coke.

Moreover, reduction of earth environment load can be attained by use of the alternative coke, the bio-coke of the invention.

Next, a usage example of the bio-coke according to the present invention as material for various application purposes will be set forth.

There is a huge amount of easily-accessible biomass, and such biomass is continuously produced. Biomass with less utilization potential such as food residues, weeds of riverbeds or the like is usually regarded as garbage, because it is considered to have little value in its usage in many cases. Such biomass is usually forced to be reclaimed or incinerated.

Considering that biomass is carbon fixed through photosynthesis and has well-ordered organization structure, it is possible to construct a continuous circulation of cascade structure, i.e. zero emission circulation environment by converting such biomass into material for various application purposes by taking advantage of its characteristics.

Bio-coke according to the present invention has maximum compressive strength of 60-200 MPa that is higher than that of iron. In addition, the bio-coke can be made from food residues, weeds of riverbeds or the like, its utility value as material is very high.

The bio-coke can be used as materials of pile-like products such as garden fences, gardening piles and nails; plate-like products such as panels for coaster or slope protection, bulkhead; etc.

When utilizing the bio-coke of the invention as a pile, some degree of impact resistance is required. To meet this requirement, it is preferable that, for example, metal particles are added to raw biomass material to improve reactivity between biomass components, or that raw biomass material crushed roughly by taking advantage of fibroid nature thereof is added to improve continuity between the components.

As described above, according to the present invention, it is made possible to utilize biomass disposed of utilized hitherto, and to show direction in which articles made of plastic material derived from chemical substances harmful to human bodies are replaced by articles derived from biomass resources continuously recyclable.

Moreover, bio-coke used as material for various application purposes can be used as a heat source as a matter of course. Therefore, when the articles made of the bio-coke finished their roles and wasted, they can be used again utilized as material of the bio-coke of the invention for example by converting the used material into carbon dust and mixing with biomass material for producing the bio-coke. Thus, cascade utilizing system, i.e. biomass cyclic use system is realized. Further, as the bio-coke decays naturally, it can be allowed to return to nature.

Next, a further example of usage of the bio-coke of the invention will be set forth.

Carbide having high hardness can be manufactured in a short period of time by further expanding the aforementioned method for producing bio-coke.

In this case, the bio-coke is further heated in an open atmosphere. Temperature and pressure are set to be 250-350° C. and 8-16 MPa respectively to obtain about 10 to 30% yield in weight.

By this processing, nearly 100% carbide can be obtained in a short period of time.

By setting temperature to 250-350° C. and pressure to 8-16 MPa, a homogeneous carbide with high degree of adhesion can be obtained in a short time.

In this processing, gasifying and exothermally reaction occur in the bio-coke and it decreases in weight as carbonization progresses, and when completely carbonized, solid matter is obtained as charcoal. When live trees are carbonized under the same conditions as above, they are rapidly gasified due to pressurizing effects, and solid matter as charcoal can not be obtained, instead only ash is obtained.

The carbide obtained by the processing mentioned above has calorific value of 30-35 MJ/kg and higher hardness than vegetable charcoal. The solid carbide matter has superior solid combustion characteristics and can be used as a heat source comparable to bincho-tan, the best vegetable charcoal in Japan.

EXAMPLES

Examples of bio-coke according to the present invention and production method thereof will be detailed hereunder.

Example 1

Sawdust of Japanese cedar was crushed to pieces of size of about 0.1 mm by using a crusher of Matsushita Electric Works made.

The crushed material was charged to our own made molding barrel (a cylindrical vessel of diameter of 40 mm and height of 250 mm) and the pressure piston was inserted into the barrel. The material was heated and pressurized to a temperature of about 210° C. and a pressure of about 16 MPa for 10 minutes.

Thereafter, the material was allowed to cool for 60 minutes while maintaining the pressure. Then the bio-coke was taken out and dried in the atmosphere.

The resultant bio-coke exhibited maximum compressive strength of about 100 MPa and calorific value of about 21 MJ/kg.

Example 2

Bio-coke was formed by the same process as Example 1 except that heating temperature was set at 180° C.

The resultant bio-coke exhibited maximum compressive strength of about 80 MPa and calorific value of about 20 MJ/kg.

Example 3

Bio-coke was formed by the same process as Example 1 except that heating temperature was set at 220° C.

The resultant bio-coke exhibited maximum compressive strength of about 120 MPa and calorific value of about 23 MJ/kg.

Example 4

Bio-coke was formed by the same process as Example 1 except that a molding barrel of diameter of 20 mm was used and heating temperature was set at 220° C. and pressure was set at 20 MPa.

The resultant bio-coke exhibited maximum compressive strength of about 200 MPa and calorific value of about 23 MJ/kg.

Example 5

Bio-coke was formed by the same process as Example 1 except that bark of Japanese cypress was used instead of Sawdust of Japanese cedar.

Bark of Japanese cypress was solidified more readily than Sawdust of Japanese cedar. The resultant bio-coke exhibited calorific value of about 21 MJ/kg and maximum compressive strength of about 100 MPa.

Example 6

Bio-coke was formed by the same process as Example 1 except that a mixture of 10% of sawdust of Japanese cedar and 90% of bark of Japanese cypress was used as material, and that the material was heated and pressurized to a temperature of about 115° C. and a pressure of about 21 MPa for 15 minutes.

The resultant bio-coke exhibited calorific value of about 21 MJ/kg and maximum compressive strength of about 83 MPa. Heating temperature was able to be decreased by about 50° C. because of the presence of high-phenolic macromolecules, polyphenol or the like, contained in the bark.

Comparative Example 1

The same process as Example 1 was adopted except that heating temperature was set at 240° C. In this comparative example, the material was entirely carbonized and not solidified.

As described above, it is recognized from above examples and comparative example that bio-coke superior in both in calorific value and maximum compressive strength was obtained when heating temperature was 115-230° C. Whereas, when heating temperature exceeded 230° C., bio-coke was not obtained due to rapid proceed of carbonization and gasification.

Therefore, as carbonization and gasification proceed rapidly in a small range of temperatures between 230° C. and 240° C., the upper limit of appropriate heating temperature for producing the bio-coke of the invention was determined to be 230° C.

Further, an experiment for demonstrating substitutability of bio-coke for coal coke was carried out by using bio-coke of maximum compressive strength of about 100 MPa and calorific value of about 21 MJ/kg with an actual cupola of internal diameter of diameter of 300 mm (owned by Naniwa Roki Co., Ltd.).

Example 7

10% of the whole coke was substituted by the bio-coke of the invention in an experimental operation of the cupola.

It was verified that metal drainage was possible similarly as the case 100% coal coke was used without large difference.

The resultant cast iron exhibited tensile strength of 120-160 MPa in the subsequent tensile test.

Example 8

Further, 50% of the whole coke was substituted by the bio-coke of the invention. The result was similar to that of example 7.

Form these results, it was recognized that cupola operation can be performed without difference from the case 100% coal coke is used even if the bio-coke of the invention is substituted by 50% for the total coke.

Example 9

Bio-coke having maximum compressive strength of about 100 MPa and calorific value of about 21 MJ/kg was further heated to 300° C. in a heating furnace under pressure of 8 MPa for 20 minutes.

The carbide obtained by this processing exhibited a yield in weight of about 20% and calorific value of about 34 MJ/kg. The carbide may be called artificial bincho-tan, the best vegetable charcoal in Japan.

Example 10

Weeds collected on a riverbed were used as material to be formed into a pile-shaped bio-coke. The pile-shaped bio-coke was molded by using a pressure piston of which the material side end face was formed into a conical hollow. Molding were carried out under conditions the same as that of example 1.

The resultant pile exhibited maximum compressive strength of about 80 MPa.

INDUSTRIAL APPLICABILITY

According to the method of the invention, solidified biomass can be produced with simple equipment with low cost, and the bio-coke produced by the method can be used as alternate fuel to coal coke as well as material for a variety of application purposes.

The invention claimed is:

1. Solidified biomass comprising semi-carbonized solid matter or pre-semi-carbonized solid matter resulting from processing in which photosynthetic raw biomass material including lignin, cellulose and hemicellulose as main components is pressure-formed while being heated under a substantially sealed-up condition to allow the hemicellulose among the main components of the raw biomass material to be thermally decomposed and to allow a low-temperature reaction to occur between the cellulose and the lignin while maintaining their skeletons, whereby said pre-semi-carbonized solid matter or semi-carbonized solid matter has a maximum compressive strength of 60-200 MPa and a calorific value of 18-23 MJ/k; and wherein the raw biomass is heated at a temperature between 115 and 230 degrees centigrade.

2. Solidified biomass according to claim 1, wherein said pre-semi-carbonized solid matter or semi-carbonized solid matter has apparent specific gravity of 1.2-1.38.

3. Solidified biomass according to claim 1, wherein the raw biomass is heated at a temperature between 185 and 230 degrees centigrade.

4. Solidified biomass comprising semi-carbonized solid matter or pre-semi-carbonized solid matter resulting from processing in which a mixture of photosynthetic raw biomass material, including lignin, cellulose and hemicellulose as main components, and metal particles is pressure-formed while being heated under a substantially sealed-up condition to allow the hemicellulose among the main components of the raw biomass material to be thermally decomposed and to allow a low-temperature reaction to occur between the cellulose and the lignin while maintaining their skeletons, whereby said pre-semi-carbonized solid matter or semi-carbonized solid matter has a maximum compressive strength of 60-200 MPa and a calorific value of 1-23 MJ/kg.

5. Solidified biomass comprising semi-carbonized solid matter or pre-semi-carbonized solid matter resulting from processing in which a mixture of photosynthetic raw biomass material, including lignin, cellulose and hemicellulose as main components, and a carbide having a biomass as a main component is pressure-formed while being heated under a substantially sealed-up condition to allow the hemicellulose among the main components of the raw biomass material to be thermally decomposed and to allow a low-temperature reaction to occur between the cellulose and the lignin while maintaining their skeletons, whereby said pre-semi-carbonized solid matter or semi-carbonized solid matter has a maximum compressive strength of 60-200 MPa and a calorific value of 18-27 MJ/kg.

6. Solidified biomass comprising:
thermally-decomposed hemicellulose;
low-temperature-reacted lignin and cellulose having their skeletons intact; and wherein
the solidified biomass has a maximum compressive strength of 60-200 MPa; and
the solidified biomass has a calorific value of 18-23 MJ/kg.

7. Solidified biomass according to claim 6, further comprising an ash of biomass.

8. Solidified biomass comprising:
thermally-decomposed hemicellulose;
low-temperature-reacted lignin and cellulose having their skeletons intact; and wherein
the solidified biomass has a maximum compressive strength of 60-200 MPa; and
the solidified biomass has an apparent specific gravity of 1.2-1.38.

9. Solidified biomass comprising:
thermally-decomposed hemicellulose;
low-temperature-reacted lignin and cellulose having their skeletons intact;
at least one metal; and wherein
the solidified biomass has a maximum compressive strength of 60-200 MPa.

10. Solidified biomass according to claim 9, wherein the at least one metal is selected from the group consisting of iron, nickel, copper, and manganese.

11. Solidified biomass according to claim 9, wherein the at least one metal is in the form of metal particles having a grain size less than or equal to 3 mm.

12. Solidified biomass according to claim 9, wherein the solidified biomass has a calorific value of 1-23 MJ/kg.

13. Solidified biomass comprising:
thermally-decomposed hemicellulose;
low-temperature-reacted lignin and cellulose having their skeletons intact;
a carbide; and wherein
the solidified biomass has a maximum compressive strength of 60-200 MPa.

14. Solidified biomass according to claim 13, wherein the carbide is in pieces less than or equal to 3 mm in size.

15. Solidified biomass according to claim 13, wherein the solidified biomass has a calorific value of 18-27 MJ/kg.

* * * * *